(12) United States Patent (10) Patent No.: US 12,697,628 B2
Wang et al. (45) Date of Patent: Aug. 4, 2026

(54) CYCLONE SEPARATOR AND DISHWASHER

(71) Applicants:Guangdong Midea White Home Appliance Technology Innovation Center Co., Ltd., Foshan (CN); Midea Group Co., Ltd., Foshan (CN)

(72) Inventors: Lixiang Wang, Foshan (CN); Site Hu, Foshan (CN); Jianqing Wu, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 345 days.

(21) Appl. No.: 18/601,962

(22) Filed: Mar. 11, 2024

(65) Prior Publication Data

US 2024/0253066 A1 Aug. 1, 2024

Related U.S. Application Data

(63) Continuation of application No. PCT/CN2021/128936, filed on Nov. 5, 2021.

(30) Foreign Application Priority Data

Sep. 29, 2021 (CN) ........................... 202111154160.8

(51) Int. Cl.
*B04C 9/00* (2006.01)
*A47L 15/42* (2006.01)
(Continued)

(52) U.S. Cl.
CPC ............ *B04C 9/00* (2013.01); *A47L 15/4206* (2013.01); *A47L 15/4208* (2013.01);
(Continued)

(58) Field of Classification Search
CPC .. B04C 9/00; B04C 5/103; B04C 5/14; B04C 5/30; B04C 2009/004; B04C 2009/005;
(Continued)

(56) References Cited

U.S. PATENT DOCUMENTS 3,529,724 A * 9/1970 Reed .................... B01D 21/267
210/197
4,150,680 A 4/1979 Johnson et al.
(Continued)

FOREIGN PATENT DOCUMENTS

CN 204445760 U 7/2015
CN 210522827 U 5/2020
(Continued)

OTHER PUBLICATIONS

Midea Group Co., Ltd., ISR, PCT/CN2021/128936, Jan. 28, 2023, 10 pgs.
(Continued)

*Primary Examiner* — Terry K Cecil
(74) *Attorney, Agent, or Firm* — Morgan, Lewis & Bockius LLP

(57) ABSTRACT

A cyclone separator in a dishwasher includes a first housing, a second housing provided inside the first housing, a first filter piece provided inside the second housing, and a back flow part. A waste collection chamber is provided between the second housing and the first housing. The first filter piece encloses and forms a first filter chamber. A flow passage is provided between the first filter piece and the second housing. The flow passage is in communication with the first filter chamber via filter holes, and the waste collection chamber is in communication with the flow passage. An inlet pipe is in communication with the flow passage. A flow medium enters the cyclone separator via the inlet pipe, and forms a cyclone in the flow passage. An outlet pipe is in (Continued)

communication with the first filter chamber, and the flow medium exits the cyclone separator via the outlet pipe.

20 Claims, 6 Drawing Sheets

(51) Int. Cl.

| | |
|---|---|
| *B01D 29/11* | (2006.01) |
| *B01D 29/64* | (2006.01) |
| *B01D 29/90* | (2006.01) |
| *B01D 36/04* | (2006.01) |
| *B04C 5/103* | (2006.01) |
| *B04C 5/14* | (2006.01) |
| *B04C 5/30* | (2006.01) |

(52) U.S. Cl.
CPC ........ *A47L 15/4225* (2013.01); *B01D 29/114* (2013.01); *B01D 29/6476* (2013.01); *B01D 29/902* (2013.01); *B01D 36/045* (2013.01); *B04C 5/103* (2013.01); *B04C 5/14* (2013.01); *B04C 5/30* (2013.01); *B04C 2009/004* (2013.01); *B04C 2009/005* (2013.01)

(58) Field of Classification Search
CPC .... B04C 5/00; A47L 15/4206; A47L 15/4208; A47L 15/4225; B01D 29/114; B01D 29/6476; B01D 29/902; B01D 36/045; B01D 29/908; B01D 29/33; B01D 29/58; Y02B 40/00
See application file for complete search history.

(56) References Cited

U.S. PATENT DOCUMENTS

| | | | |
|---|---|---|---|
| 2007/0144115 A1 | 6/2007 | Ni | |
| 2013/0068254 A1 | 3/2013 | Besse et al. | |
| 2014/0102485 A1 | 4/2014 | Abdulfattah et al. | |
| 2016/0000286 A1 | 1/2016 | Liu et al. | |
| 2019/0239715 A1 | 8/2019 | Thiyagarajan | |

FOREIGN PATENT DOCUMENTS

| | | | |
|---|---|---|---|
| CN | 212679048 U | 3/2021 | |
| DE | 10318862 A1 | 7/2004 | |
| EP | 0752231 B1 | 1/2002 | |
| JP | 2011125790 A | 6/2011 | |
| KR | 101036019 B1 | 5/2011 | |
| KR | 20120095767 A | 8/2012 | |
| KR | 20160017692 A | 2/2016 | |
| WO | WO 2012095315 A2 | 7/2012 | |

OTHER PUBLICATIONS

Chinese First Office Action, Chinese Application No. 202111154160.8, mailed Apr. 18, 2025 (28 pages).
Midea Group Co., Ltd., WO, PCT/CN2021/128936, Jun. 29, 2022, 3 pgs.
Midea Group Co., Ltd., IPRP, PCT/CN2021/128936, Apr. 2, 2024, 4 pgs.
Midea Group Co., Ltd., Extended European Search Report, EP Patent Application No. Aug. 21, 2024, 5 pgs.

* cited by examiner

CYCLONE SEPARATOR AND DISHWASHER

RELATED APPLICATIONS

The present disclosure is a continuation of International (PCT) Patent Application No. PCT/CN2021/128936, filed on Nov. 5, 2021, which claims priority to Chinese Patent Application No. 202111154160.8 entitled "CYCLONE SEPARATOR AND DISHWASHER", filed on Sep. 29, 2021, in the National Intellectual Property Administration of China, the contents of which are herein incorporated by reference in their entirety.

TECHNICAL FIELD

The present disclosure relates to the technical field of cyclone separators, in particular to a cyclone separator and a dishwasher.

BACKGROUND

Currently, a cyclone separator is a device used for a gas-solid separation or a liquid-solid separation.

Firstly, if the cyclone separator is independently used to separate solid particles from a fluid, when the densities of solid particles are only slightly greater than the density of the fluid and the solid particles are in lamellar shapes, the centrifugal forces of the solid particles are weakened, and the solid particles located at the periphery may not be deposited. The solid particles may flow out from an outlet of the cyclone separator, and a solid-liquid separation may not be achieved.

Secondly, a single separation efficiency of the cyclone separator is less than 100%, and the wastes may not be completely filtered by a single separation, which may result in a secondary pollution to downstream components.

SUMMARY

According to the first aspect of the present disclosure, a cyclone separator is provided. The cyclone separator includes a first housing, a second housing, a first filter element, a flowing passage, an input pipe, an output pipe, and a reflux portion or return portion. The second housing is arranged in the first housing. A waste collection chamber is arranged between the second housing and the first housing. The first filter element is arranged in the second housing. The first filter element is enclosed to form a first filter chamber. The flowing passage is located between the first filter element and the second housing. The flowing passage is in communication with or fluidly connected to the first filter chamber through a filter hole, and the waste collection chamber is in communication with the flowing passage. The input pipe is in communication with the flowing passage, and a flowing medium enters the cyclone separator through the input pipe and forms a cyclone or a rotational flow in the flowing passage. The output pipe is in communication with the first filter chamber, and the flowing medium is discharged from the cyclone separator through the output pipe. The flowing medium flows from the waste collection chamber to the output pipe through the reflux portion.

The cyclone separator provided by some embodiments of the present disclosure includes the first housing, the second housing, the first filter element, and the reflux portion. The second housing is arranged in the first housing. The waste collection chamber is arranged between the second housing and the first housing. The waste collection chamber is configured to collect waste particles. The first filter element is arranged in the second housing. The first filter element has the filter hole. When the flowing medium passes or flows through the first filter element, the liquid may enter the first filter chamber of the first filter element through the filter hole, and the waste particles may be blocked out of the first filter element. The flowing passage is arranged between the first filter element and the second housing. The flowing passage is in in communication with the first filter chamber through the filter hole.

In some embodiments, the cyclone separator further includes an input pipe. The input pipe may be arranged on the first housing. In some embodiments, the input pipe is arranged on the second housing. In some embodiments, the input pipe is arranged on both the first housing and the second housing. The input pipe is in communication with the flowing passage. In some embodiments, at least part of the output pipe extends into the first filter chamber, in this way, the output pipe is in communication with the filter chamber, and the structure is simplified. A pump assembly is arranged at the input pipe of the cyclone separator or at the output pipe of the cyclone separator. The pump assembly may pressurize the flowing medium to disturb the flowing medium in the flowing passage. In some embodiments, when the pump assembly is arranged at the input pipe, the pressurized flowing medium may enter the flowing passage through the input pipe and along the tangential direction of the inner wall of the second housing, and then form a cyclone in the flowing passage. That is, the pressurized flowing medium flows along the peripheral direction of the inner wall of the second housing to form the cyclone. It should be noted that, the flowing passage is a circular passage, and the flowing medium forms a cyclone in the circular passage, and then enters the first filter chamber through the filter hole on the first filter element.

In some embodiments, the cyclone separator also includes the reflux portion, and the reflux portion is configured to guide the flowing medium to flow from the waste collection chamber to the output pipe. The reflux portion is in a low-pressure region, the flowing passage is in a high-pressure region, and the flowing medium has a trend of flowing from the high-pressure region to the low-pressure region. Under this flowing trend, although the centrifugal force of solid particles located in the flowing passage with a density slightly greater than that of the density of fluid is weakened, the solid particles may still flow downwards towards the waste collection chamber, thereby achieving a solid-liquid separation. Besides, the filter effect of the first filter element may be ensured, and the phenomenon that the first filter element is blocked by the waste particles may be avoided. In addition, the wastes in the flowing passage may be brought into the waste collection chamber, thereby avoiding the waste particles from entering the filter chamber and avoiding secondary pollution to downstream components.

In some embodiments, during the operation of the cyclone separator, due to flowing characteristics of the cyclone, the region close to the rotating axis of the fluid in the first filter chamber is the low-pressure region. The reflux portion may be arranged in the low-pressure region, in this way, the reflux portion is in the region with low pressure to guide the flowing medium in the flowing passage to flow into the waste collection chamber. In some embodiments, the reflux portion may be arranged in the waste collection chamber. The reflux portion may be connected to a negative pressure device, and the negative pressure device may enable the position on which the reflux portion is located to be the low-pressure region, thereby driving the flowing medium in the flowing passage to flow towards the waste collection chamber. The arranging positions of the reflux portion are various, as long as the reflux portion may guide the flowing medium to flow along from the flowing passage to the waste collection chamber. The reflux portion may also be arranged on other positions, which are not listed herein.

It should also be noted that, the fluid entering the first filter chamber may pass through the first filter chamber and directly flow out of the first filter chamber through the output pipe. The first end of the output pipe extends into the first filter chamber, and the second end of the output pipe is in communication with an external drainage pipe.

In some embodiments, the reflux portion includes a reflux opening arranged on the output pipe, and the reflux opening is arranged out of the first filter chamber.

In some embodiments, the output pipe includes an outer pipe and an inner pipe in communication with each other, at least part of the inner pipe is arranged out of the first filter chamber and located in the first housing, the reflux opening is arranged on the inner pipe and located out of the first filter chamber, and the outer pipe is located out of the first housing.

In some embodiments, the inner pipe and the first filter chamber are arranged coaxially.

In some embodiments, the cyclone separator further includes: a second filter element, arranged between the waste collection chamber and the reflux portion. The flowing medium is capable of flowing from the reflux portion to the output pipe after passing through the second filter element.

In some embodiments, the cyclone separator further includes: a waste-discharge outlet, in communication with the waste collection chamber.

In some embodiments, a buffer portion is formed by a part of the second housing protruding away from the first filter element.

In some embodiments, the cyclone separator further includes: a guiding portion, located in the first filter chamber.

In some embodiments, the guiding portion includes a cone, the top of the cone is close to the output pipe, and the bottom of the cone is away from the output pipe.

In some embodiments, the cyclone separator further includes: a bottom housing, connected to the first housing. The second housing is located between the bottom housing and the first housing. A channel is formed between the bottom housing and the second housing, the flowing passage is in communication with the waste collection chamber through the channel, and the reflux portion is arranged away from the bottom housing.

In some embodiments, the cyclone separator further includes: a guiding element, arranged on the bottom housing and located in the channel.

In some embodiments, the guiding element includes: a plurality of guiding vanes, spaced apart from each other on the bottom housing. A tangential direction of an inlet of each of the plurality of guiding vanes is opposite to a rotating direction of the flowing medium in the second housing.

In some embodiments, the cyclone separator further includes: a driving element; and a first cleaning element, attached to an outer wall of the first filter element. The driving element is configured to drive the first cleaning element to move relative to the first filter element.

According to a second aspect of the present disclosure, a dishwasher is provided. The dishwasher includes: the cyclone separator according to any one of claims 1 to 13; and a pump assembly, in communication with an output pipe or an input pipe of the cyclone separator. The pump assembly is configured to pump a flowing medium.

In some embodiments, the input pipe of the cyclone separator is located at a level lower than a level where the output pipe of the cyclone separator is located.

Additional aspects and advantages of the present disclosure may be obvious in the below description part or be understood from the practice of the present disclosure.

BRIEF DESCRIPTION OF THE DRAWINGS

The foregoing and/or additional aspects and advantages of the present disclosure may become apparent and readily appreciated from the following description of the embodiments in combination with the accompanying figures.

Herein, corresponding relationships between reference marks in FIGS. 1 to 7 and component names are as follows:

1 cyclone separator,
10 waste collection chamber,
11 first housing, 110 avoidance opening,
12 second housing, 12*a* buffer portion, 12*b* connecting snap or buckle,
120 bottom housing,
122 guiding element, 122*a* guiding vane,
131 first filter element,
132 second filter element,
140 flowing passage, 141 reflux passage or return passage, 142 input pipe, 143 output pipe,
1431 outer pipe, 1432 inner pipe, 1432*a* pipe body, 1432*b* assembly protrusion, 144 waste-discharge outlet, 145 channel,
15 reflux portion or return portion,
16 guiding portion,
17 driving element, 171 transmission shaft, 172 coupler, 173 sealing element, 174 bearing,
181 first cleaning element, 182 second cleaning element,
191*a* first driving gear, 191*b* first driven gear,
192*a* second driving gear, 192*b* second driven gear,
2 dishwasher,
21 pump assembly, 22 shell, 23 chassis, 24 spray arm, 25 liquid-supply pipeline, 26 circulation pipeline.

DETAILED DESCRIPTIONS

In order to understand the aforesaid objects, features, and advantages of the present disclosure more clearly, a detailed description of the disclosure may be rendered with reference to specific embodiments and appended figures. It should be noted that the embodiments of the present disclosure and features of the embodiments may be combined with each other without conflict.

In the following description, numerous details are intended to provide a thorough understanding of the present disclosure. However, the present disclosure may be implemented in other ways different from those described herein. Therefore, the scope of the present disclosure is not limited to the embodiments disclosed below.

A cyclone separator 1 and a dishwasher 2 provided by some embodiments of the present disclosure are described below with reference to FIGS. 1 to 7.

Figure 2:
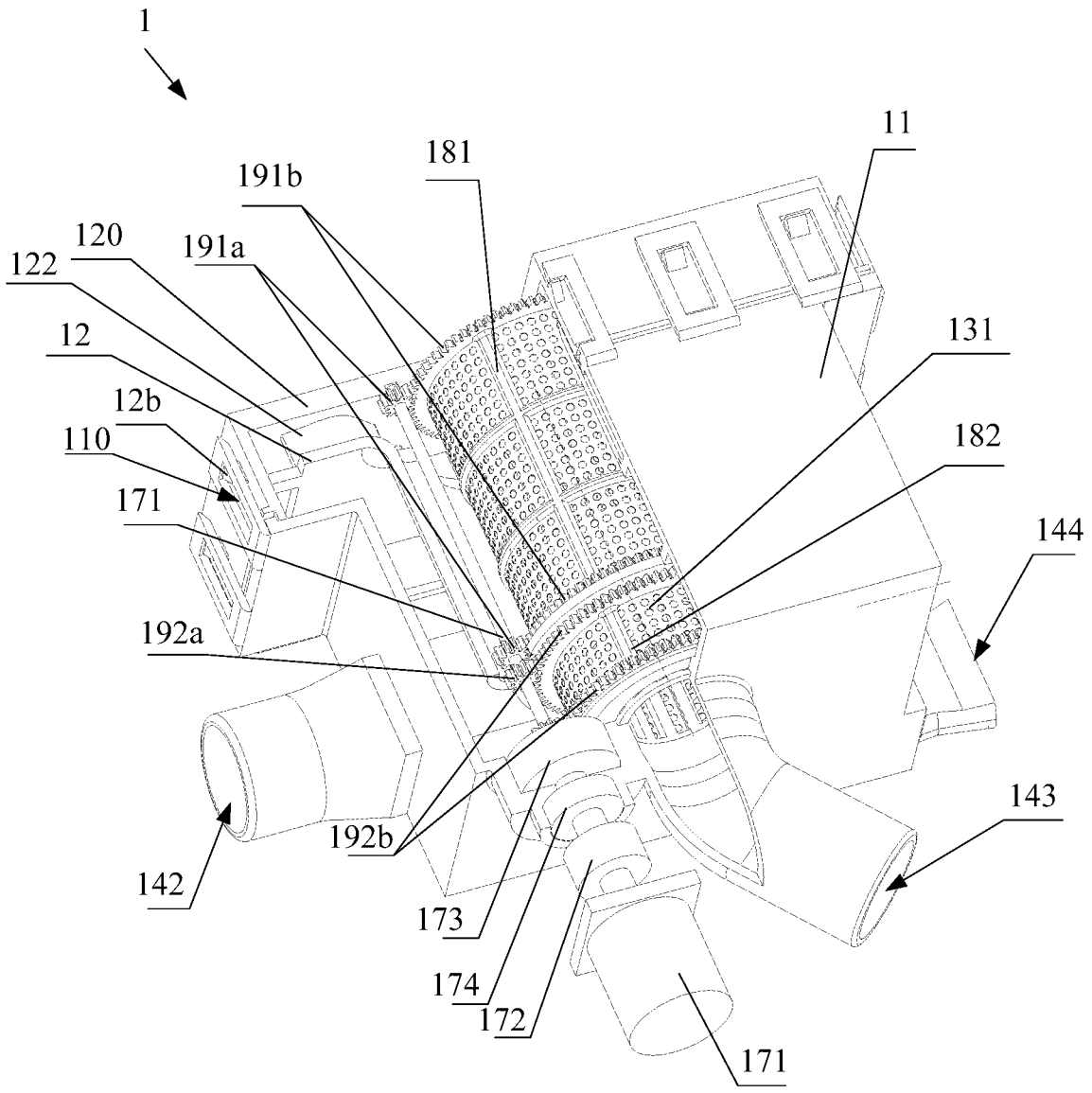
FIG. 2 is an axial side sectional view of the cyclone separator according to some embodiments of the present disclosure.
Figure 3:
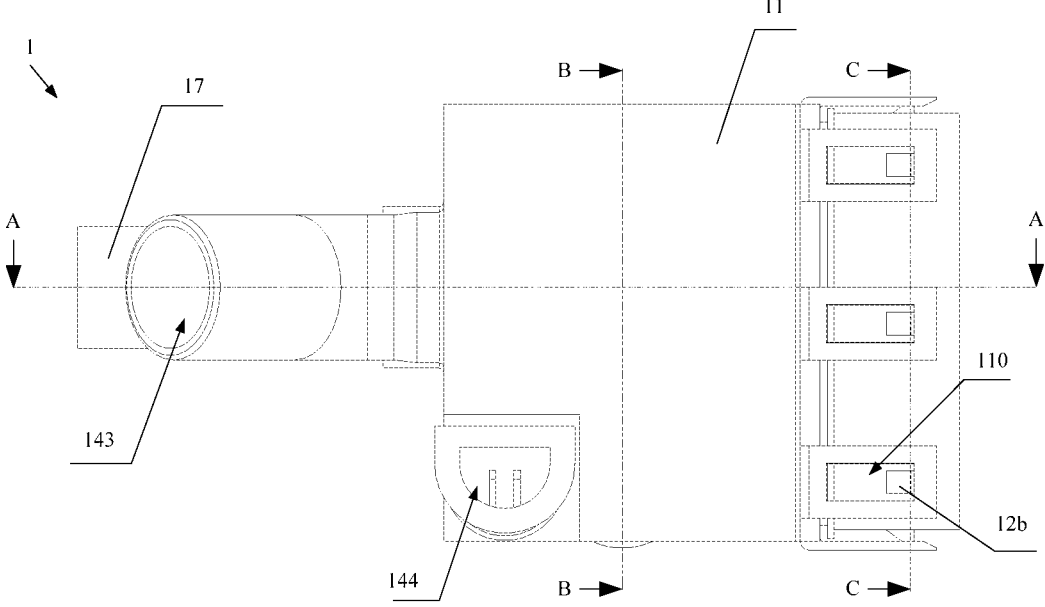
FIG. 3 is a side view of the cyclone separator according to some embodiments of the present disclosure.
Figure 4:
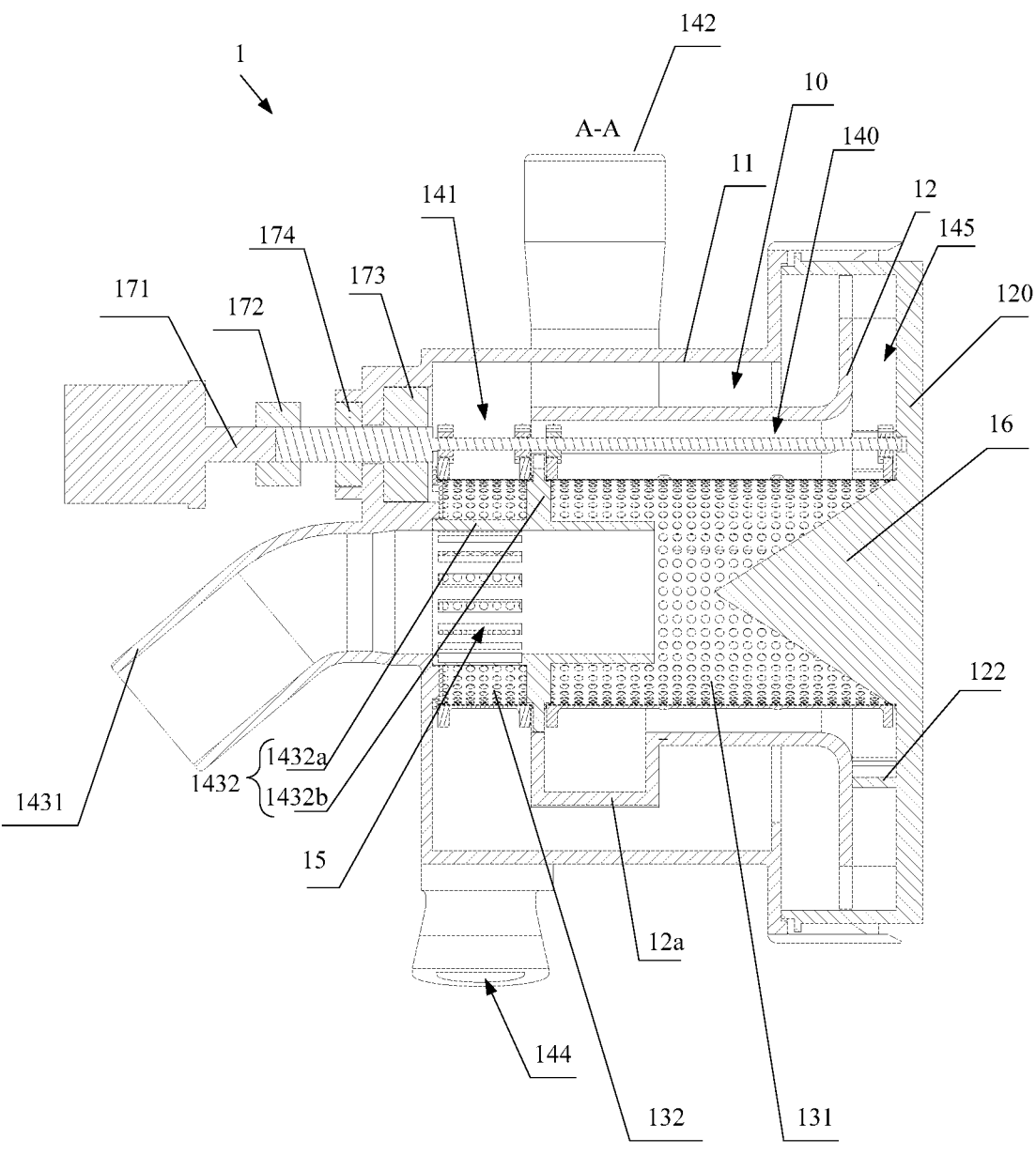
FIG. 4 is a sectional view of the cyclone separator shown in FIG. 3 along A-A according to some embodiments of the present disclosure.

According to a first aspect of the present disclosure, as shown in FIGS. 2 and 4, a cyclone separator 1 is provided. The cyclone separator 1 includes a first housing 11, a second housing 12, a first filter element 131, a flowing passage 140, an input pipe 142, an output pipe 143, and a reflux portion or return portion 15. The second housing 12 is arranged in the first housing 11. A waste collection chamber 10 is arranged between the second housing 12 and the first housing 11. The first filter element 131 is arranged in the second housing 12. The first filter element 131 is enclosed to form a first filter chamber. The flowing passage 140 is located between the first filter element 131 and the second housing 12. The flowing passage 140 is in communication with or fluidly connected to the first filter chamber through a filter hole, and the waste collection chamber 10 is in communication with the flowing passage 140. The input pipe 142 is in communication with the flowing passage 140, and a flowing medium enters the cyclone separator 1 through the input pipe 142 and forms a cyclone or a rotational flow in the flowing passage 140. The output pipe 143 is in communication with the first filter chamber, and the flowing medium is discharged from the cyclone separator 1 through the output pipe 143. The flowing medium flows from the waste collection chamber 10 to the output pipe 143 through the reflux portion 15.

The cyclone separator 1 provided by some embodiments of the present disclosure includes the first housing 11, the second housing 12, the first filter element 131, and the reflux portion 15. The second housing 12 is arranged in the first housing 11. The waste collection chamber 10 is arranged between the second housing 12 and the first housing 11. The waste collection chamber 10 is configured to collect waste particles. The first filter element 131 is arranged in the second housing 12. The first filter element 131 has the filter hole. When the flowing medium passes or flows through the first filter element 131, the liquid may enter the first filter chamber of the first filter element 131 through the filter hole, and the waste particles may be blocked out of the first filter element 131. The flowing passage 140 is arranged between the first filter element 131 and the second housing 12. The flowing passage 140 is in in communication with the first filter chamber through the filter hole.

In some embodiments, the cyclone separator 1 further includes an input pipe 142. The input pipe 142 may be arranged on the first housing 11. In some embodiments, the input pipe 142 is arranged on the second housing 12. In some embodiments, the input pipe 142 is arranged on both the first housing 11 and the second housing 12. The input pipe 142 is in communication with the flowing passage 140. In some embodiments, at least part of the output pipe 143 extends into the first filter chamber, in this way, the output pipe 143 is in communication with the filter chamber, and the structure is simplified. A pump assembly is arranged at the input pipe 142 of the cyclone separator 1 or at the output pipe 143 of the cyclone separator 1. The pump assembly may pressurize the flowing medium to disturb the flowing medium in the flowing passage 140. In some embodiments, when the pump assembly is arranged at the input pipe 142, the pressurized flowing medium may enter the flowing passage 140 through the input pipe 142 and along the tangential direction of the inner wall of the second housing 12, and then form a cyclone in the flowing passage 140. That is, the pressurized flowing medium flows along the peripheral direction of the inner wall of the second housing 12 to form the cyclone. It should be noted that, the flowing passage 140 is a circular passage, and the flowing medium forms a cyclone in the circular passage, and then enters the first filter chamber through the filter hole on the first filter element 131.

In some embodiments, the cyclone separator 1 also includes the reflux portion 15, and the reflux portion 15 is configured to guide the flowing medium to flow from the waste collection chamber 10 to the output pipe 143. The reflux portion 15 is in a low-pressure region, the flowing passage 140 is in a high-pressure region, and the flowing medium has a trend of flowing from the high-pressure region to the low-pressure region. Under this flowing trend, although the centrifugal force of solid particles located in the flowing passage 140 with a density slightly greater than that of the density of fluid is weakened, the solid particles may still flow downwards towards the waste collection chamber 10, thereby achieving a solid-liquid separation. Besides, the filter effect of the first filter element 131 may be ensured, and the phenomenon that the first filter element 131 is blocked by the waste particles may be avoided. In addition, the wastes in the flowing passage 140 may be brought into the waste collection chamber 10, thereby avoiding the waste particles from entering the filter chamber and avoiding secondary pollution to downstream components.

In some embodiments, during the operation of the cyclone separator 1, due to flowing characteristics of the cyclone, the region close to the rotating axis of the fluid in the first filter chamber is the low-pressure region. The reflux portion 15 may be arranged in the low-pressure region, in this way, the reflux portion 15 is in the region with low pressure to guide the flowing medium in the flowing passage 140 to flow into the waste collection chamber 10. In some embodiments, the reflux portion 15 may be arranged in the waste collection chamber 10. The reflux portion 15 may be connected to a negative pressure device, and the negative pressure device may enable the position on which the reflux portion 15 is located to be the low-pressure region, thereby driving the flowing medium in the flowing passage 140 to flow towards the waste collection chamber 10. The arranging positions of the reflux portion 15 are various, as long as the reflux portion 15 may guide the flowing medium to flow along from the flowing passage 140 to the waste collection chamber 10. The reflux portion 15 may also be arranged on other positions, which are not listed herein.

It should also be noted that, the fluid entering the first filter chamber may pass through the first filter chamber and directly flow out of the first filter chamber through the output pipe 143. The first end of the output pipe 143 extends into the first filter chamber, and the second end of the output pipe 143 is in communication with an external drainage pipe.

In some embodiments, as shown in FIGS. 2 and 4, the reflux portion 15 includes a reflux opening or reflux inlet arranged on the output pipe 143. The reflux opening is arranged out of the first filter chamber.

In some embodiments, the output pipe 143 includes a first end facing the first filter element 131 and a second end connected to the drainage pipe. The first end of the output pipe 143 extends into the first filter chamber. The reflux opening is arranged on the output pipe 143, and the reflux opening is located out of the first filter chamber. In the flowing process of the fluid, the fluid may enter in the output pipe 143 through the first end of the output pipe 143, and then flow out the output pipe 143 through the second end.

In some embodiments, the output pipe 143 may be formed as an integral pipe or a one-piece pipe or may be formed by splicing two pipes together, as shown in FIG. 4. In some embodiments, the output pipe 143 includes an inner pipe 1432 and an outer pipe 1431 in communication with each other, and the reflux opening is arranged on the inner pipe 1432. At least part of the inner pipe 1432 is located out of the first filter chamber and within the first housing 11. The outer pipe 1431 is located out of the first housing 11. The reflux opening is arranged on the inner pipe 1432 and is located out of the first filter chamber. There is a gap between the inner pipe 1432 and the first filter element 131, in this way, the inner pipe 1432 may not be closely or tightly attached to the first filter element 131, so as to avoid the filter hole on the first filter element 131 from being blocked due to the arrangement of the inner pipe 1432, and the fluid may flow in the gap to meet the filter efficiency of the cyclone separator 1. It should be noted that, the reflux passage 141 is arranged between the part of the inner pipe 1432 located out of the first filter chamber and the first housing 11. The reflux passage 141 is in communication with the waste collection chamber 10. A part of the inner pipe 1432 corresponding to or facing the reflux passage 141 is provided with the reflux opening. Since the inner pipe 1432 and the first filter chamber are arranged coaxially, the region close to the rotating central axis of the fluid in the first filter chamber is the low-pressure region according to the flowing characteristics of the cyclone, that is, the reflux opening is located in the low-pressure region of the first filter chamber. The reflux opening is used for the fluid to flow through. During the operation of the cyclone separator 1, the flowing medium entering the flowing passage 140 may form a cyclone. The flowing medium may enter the first filter chamber through the first filter element 131, and then flow out through the inner pipe 1432 and the outer pipe 1431. Meanwhile, under the guidance of the reflux portion 15, the flowing medium in the flowing passage 140 flows to the reflux opening through the waste collection chamber 10 and the reflux passage 141, and then flows out through the inner pipe 1432 and the outer pipe 1431. Based on a flow conservation principle, a flow towards the waste collection chamber 10 may be formed in the flowing passage 140 to supplement the flow in the reflux opening. The flowing medium in the flowing passage 140 flows to the waste collection chamber 10 and may carry waste particles to the waste collection chamber 10 in a flowing process. In this way, the amount of waste particles separated into the waste collection chamber 10 within a unit duration may be increased, and the blockage of the first filter element 131 may be effectively alleviated.

In some embodiments, the reflux opening is a strip-shaped hole, a circular hole, etc.

In some embodiments, as shown in FIG. 4, the inner pipe 1432 includes a pipe body 1432*a* and an assembly protrusion 1432*b*. The reflux opening is defined on the pipe body 1432*a*. One end of the pipe body 1432*a* is arranged on the first housing 11. The assembly protrusion 1432*b* is located on the outer wall of the pipe body 1432*a*, and the assembly protrusion 1432*b* is connected to the first filter element 131.

In some embodiments, the inner pipe 1432 includes the pipe body 1432*a* and the assembly protrusion 1432*b*. The pipe body 1432*a* is a circular pipe, and the reflux opening is arranged on the pipe body 1432*a*. The fluid may enter the pipe body 1432*a* through the reflux opening, and then flow to the outer pipe 1431. The reflux opening facing or corresponding to the reflux passage 141 is arranged on the pipe body 1432*a*. The reflux opening is used to circulate the fluid flowing from the reflux passage 141, therefore the reflux opening only needs to be arranged corresponding to the reflux passage 141. There is no need to arrange the reflux opening on other positions, so as to reduce processing difficulty and reduce an impact on an overall structural strength by a great opening area of the pipe body 1432*a*. The assembly protrusion 1432*b* is arranged on the outer wall of the pipe body 1432*a*. The assembly protrusion 1432*b* is used for a fixed connection between the pipe body 1432*a* and the first filter element 131. The components with different functions are relatively independent of each other to avoid interference between each other.

In some embodiments, the assembly protrusion 1432*b* extends around a peripheral direction of the pipe body 1432*a*, so as to fix the position of the pipe body 1432*a* in various directions. In some embodiments, the assembly protrusion 1432*b* is located on the center position of the pipe body 1432*a*, so that the pipe body 1432*a* on both sides of the assembly protrusion 1432*b* may be relatively balanced under force.

In some embodiments, as shown in FIGS. 2 and 4, the cyclone separator 1 further includes a second filter element 132. The second filter element 132 is arranged between the waste collection chamber 10 and the reflux portion 15. After passing through the second filter element 132, the flowing medium flows to the output pipe 143 through the reflux portion 15.

In some embodiments, the cyclone separator 1 further includes the second filter element 132. The second filter element 132 is located between the waste collection chamber 10 and the reflux portion 15. Under the action of the reflux portion 15, the flowing medium flows from the flowing passage 140 to the waste collection chamber 10. The second filter element 132 may filter the flowing medium flowing from the waste collection chamber 10 to the output pipe 143, thereby further improving the filter effect of the cyclone separator 1.

In some embodiments, the second filter element 132 is connected to the first housing 11. The second filter element 132 is correspondingly arranged in the reflux passage 141. The second filter element 132 has a second filter chamber. The second filter element 132 is mainly configured to intercept the waste particles in the waste collection chamber 10. The flowing medium from the waste collection chamber 10 flows to the second filter element 132 through the reflux passage 141. The fluid passing through the second filter element 132 may enter the second filter chamber, pass through the reflux opening, and then flows out through the output pipe 143. The first filter element 131 is located between the second filter element 132 and the second housing 12. That is, compared with the second filter element 132, the first filter element 131 is disposed further away from the output pipe 143 than the second filter element 132. The first filter element 131 is arranged corresponding to or facing the flowing passage 140. The first filter element 131 has the first filter chamber, and the second filter chamber is in communication with the first filter chamber. In a forward flowing process, the flowing medium enters the first filter chamber through the first filter element 131, then flows to the second filter chamber, and finally flows out through the output pipe 143. The first filter element 131 filters the particles each of which has a size greater than a mesh size to achieve a complete filtration. Meanwhile, the first filter element 131 may also significantly reduce the strength of the cyclone in the second housing 12 and significantly reduce the resistance of the entire cyclone separator 1. Under the action of the reflux portion 15, the flowing medium in the flowing passage 140 may flow towards the waste collection chamber 10. The flowing medium in the waste collection chamber 10 may flow to the second filter element 132 through the reflux passage 141, and the waste particles may be intercepted by the second filter element 132. The fluid enters the second filter chamber through the second filter element 132, passes through the reflux opening, and then flows out through the output pipe 143.

The cyclone separator 1 is formed by the combination of the second filter element 132 and the first filter element 131, and the assembly difficulty and the production difficulty may be reduced.

It should be noted that, the second filter element 132 may assist the reflux portion 15 to ensure that the waste particles may be intercepted when a large volume of reflux is formed due to the arrangement of the reflux opening. In this way, the waste particles brought by the reflux process may be intercepted at the reflux passage 141, and then may be collected in the waste collection chamber 10.

It should be noted that, as shown in FIGS. 2 and 4, the first filter element 131 and the second filter element 132 are combined to form a filter mechanism of the cyclone separator 1. That is, the first filter element 131 and the second filter element 132 are two independent components. A splicing process of the two components includes a splicing position or a matching position, and a part of the reflux portion 15 may be clamped between the first filter element 131 and the second filter element 132. Therefore, it is unnecessary to add additional matching components for a fixed installation of the reflux portion 15, and the splicing position or the matching position between the first filter element 131 and the second filter element 132 may be effectively utilized. In this way, the product structure may be simplified, and the structural compactness of the overall product may be improved.

Figure 1:
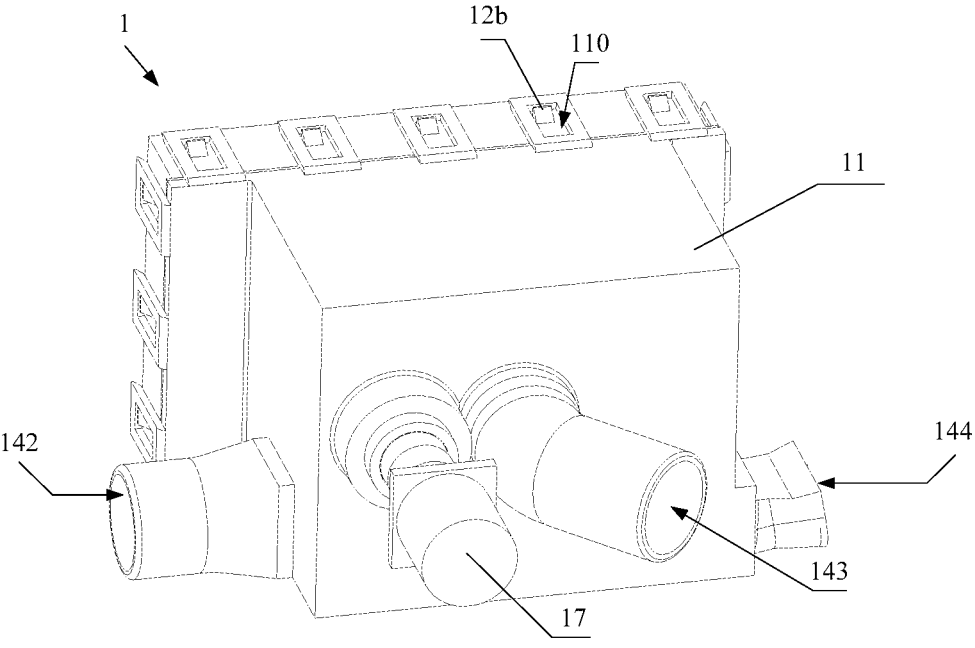
FIG. 1 is a schematic structural view of the cyclone separator according to some embodiments of the present disclosure.

In some embodiments, as shown in FIGS. 1, 2, and 4, the cyclone separator 1 also includes a waste-discharge outlet 144. The waste-discharge outlet 144 is in communication with the waste collection chamber 10.

In some embodiments, the cyclone separator 1 also includes a waste-discharge outlet 144. The waste-discharge outlet is arranged on the first housing 11. The waste-discharge outlet 144 is in communication with the waste collection chamber 10. The waste particles intercepted by the second filter element 132 and the first filter element 131 may be deposited in the waste collection chamber 10. During the operation of the cyclone separator 1, the waste-discharge outlet 144 may be opened intermittently. After the waste particles are accumulated for a certain duration, the waste particles may be intensively discharged from the waste collection chamber 10.

It should be noted that, the flowing medium may enter the cyclone separator 1 through the input pipe. After being filtered by the first filter element 131, the flowing medium is substantially divided into fluid and waste particles (solids). The fluid may flow out through the output pipe, and the solids may be discharged out of the cyclone separator 1 through the waste-discharge outlet 144.

In some embodiments, the waste-discharge outlet 144 is arranged corresponding to or facing the reflux portion 15, in this way, more wastes may be discharged.

In some embodiments, a part of the second housing 12 protrudes away from the first filter element 131 to form a buffer portion 12*a*.

In some embodiments, a part of the second housing 12 protrudes away from the first filter element 131 to form the buffer portion 12*a*. The buffer portion 12*a* may form a buffer groove. The buffer groove is used to increase the volume of the flowing passage 140, in this way, a large amount of flowing medium entering the flowing passage 140 may be well buffered, so as to prevent the flowing medium from directly slapping on the first filter element 131 since the flowing medium is unable to form a cyclone in time, prevent the wastes from adhering to the first filter element 131 and blocking the flow, and prevent a large amount of flowing medium with excessively high velocity from directly slapping on the first filter element 131. When a large amount of flowing medium with excessively high velocity directly slaps on the first filter element 131, the structural strength of the first filter element 131 may be threatened.

In some embodiments, as shown in FIGS. 2 and 4, the cyclone separator 1 also includes a guiding portion 16. The guiding portion 16 is located in the first filter chamber.

In some embodiments, the cyclone separator 1 also includes a guiding portion 16. The guiding portion 16 is located in the first filter chamber. The guiding portion 16 and the second housing 12 form a passage that shrinks outward. When the rotating fluid in the flowing passage 140 moves from left to right, the fluid tends to move towards the waste collection chamber 10. At this time, the particles in the flowing medium may also flow towards the waste collection chamber 10, which is consistent with the direction of a centrifugal separation, thereby improving the centrifugal separation.

Figure 6:
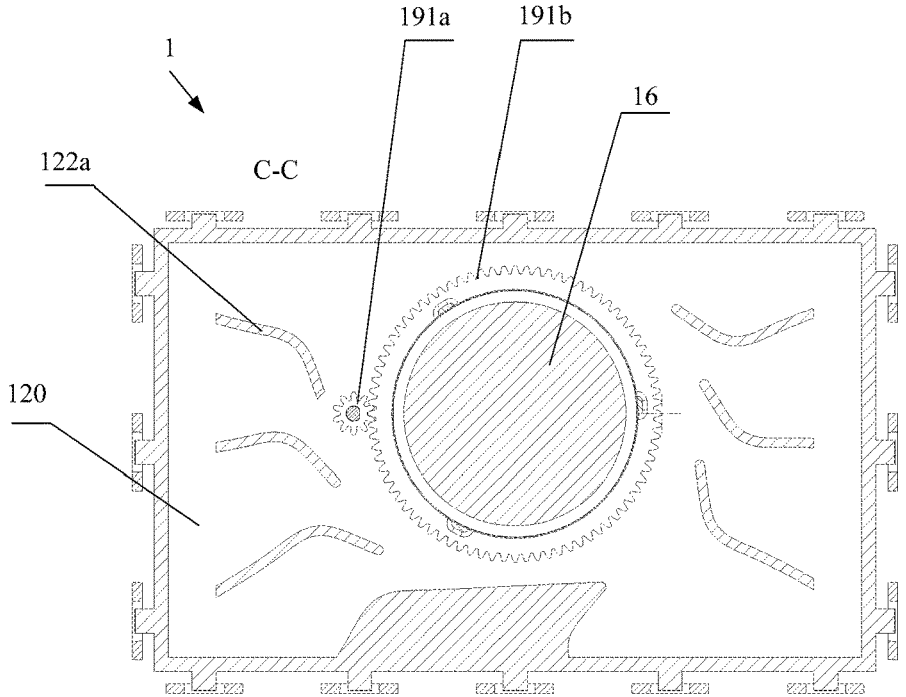
FIG. 6 is a sectional view of the cyclone separator shown in FIG. 3 along C-C according to some embodiments of the present disclosure.

In some embodiments, as shown in FIGS. 4 and 6, the guiding portion 16 includes a cone. The top of the cone is close to the output pipe 143, and the bottom of the cone is away from the output pipe 143.

In some embodiments, the guiding portion 16 includes a cone. As for the definition of the cone, a straight line on which a leg of a right triangle is located is taken as a rotating axis, and an aggregation of the surface formed by rotating the other two edges by 360° is called a cone. The rotating axis is called the axis of the cone, the curved surface formed by rotating the edge that is perpendicular to the axis is called the bottom surface of the cone, and the curved surface formed by rotating the edge that is not perpendicular to the axis is called the side surface of the cone. Herein, the top of the cone is located in the first filter chamber, and the side surface of the cone forms a guiding surface. The guiding surface may guide the fluid to flow from the flowing passage 140 to the waste collection chamber 10.

Since the guiding portion 16 is cone shaped, the cone may also help the fluid in the filter chamber to form a cyclone better, in this way, the lamellar waste particles in the flowing passage 140 may be thrown outward under the action of the centrifugal force, and the fluid may flow towards the output pipe along the guiding surface of the cone.

It should be noted that, when the guiding portion 16 is a cone, the space formed between the cone and the second housing 12 is gradually shrunk from the top (left) of the cone to the bottom (right) of the cone. When the rotating fluid in the flowing passage 140 moves from left to right, the fluid moves towards the bottom of the cone, that is, towards the waste collection chamber 10, in this way, the particles in the flowing medium move towards the waste collection chamber, which is consistent with the direction of a centrifugal separation, and the effect of the centrifugal separation may be improved.

In some embodiments, as shown in FIGS. 2, 3, 4 and 6, the cyclone separator 1 also includes a bottom housing 120. The bottom housing 120 is connected to the first housing 11. The second housing 12 is located between the bottom housing 120 and the first housing 11. The flowing passage 140 and the waste collection chamber 10 are in communication with each other through a channel 145 formed between the bottom housing 120 and the second housing 12. The reflux portion 15 is disposed away from the bottom housing 120.

In some embodiments, the cyclone separator 1 also includes the bottom housing 120. The bottom housing 120 is detachably connected to the first housing 11. The bottom housing 120 is located on a side of the first housing 11 away from the output pipe 143. The guiding portion 16 is arranged on the bottom housing 120. The second housing 12 is located between the bottom housing 120 and the first housing 11. The second housing 12 is detachably connected to the first housing 11. In some embodiments, the first housing 11 defines an avoidance opening 110, a part of the second housing 12 forms a connecting snap 12b, and the connecting snap 12b is engaged with the first housing 11 through the avoidance opening 110, in this way, the second housing 12 is installed on the first housing 11. It should be noted that, the number of the connecting snaps 12b is multiple, the number of the avoidance openings 110 is multiple, the multiple connecting snaps 12b and the multiple avoidance openings 110 are arranged in one-to-one correspondence, in this way, the position of the second housing 12 on the first housing 11 is stable in various directions. The bottom housing 120, the first housing 11, and the second housing 12 are combined to form the flowing passage 140, the channel 145, and the waste collection chamber 10 which are in communication with each other, in this way, the disturbance of the strong cyclone in the flowing passage 140 on the waste collection chamber 10 may be reduced, and the waste particles in the waste collection chamber 10 may be deposited and may not scatter everywhere.

In some embodiments, a part of the first filter element 131 is located between the bottom housing 120 and the second housing 12. The second filter element 132 is located in the first housing 11.

In some embodiments, as shown in FIG. 6, the cyclone separator 1 also includes a guiding element 122. The guiding element 122 is arranged on the bottom housing 120 and located in the channel 145.

In some embodiments, the cyclone separator 1 also includes a guiding element 122. The guiding element 122 is arranged on the bottom housing 120 and located in the channel 145. In other words, the guiding element 122 is arranged towards the flowing passage 140. The guiding element 122 may reduce the velocity of the flowing medium. If the velocity of the flowing medium entering the flowing passage 140 is too great, when the flowing medium with a great velocity directly flows into the waste collection chamber 10, a great disturbance may be brought to the waste collection chamber 10, and the waste particles deposited in the waste collection chamber 10 may be disturbed again. By arranging the guiding element 122, the flowing medium with a great velocity may be well restricted, in this way, the velocity of the flowing medium entering the waste collection chamber 10 may be reduced, the waste particles may be easily deposited after entering the waste collection chamber 10, thereby facilitating the collection of the waste particles.

In some embodiments, the guiding element 122 includes multiple guiding vanes 122a. The multiple guiding vanes 122a are spaced apart from each other on the bottom housing 120. The tangential direction of the inlet of the guiding vane 122a is opposite to the rotating direction of the fluid in the second housing 12.

In some embodiments, the guiding element 122 includes multiple guiding vanes 122a, and the multiple guiding vanes 122a are spaced apart from each other on the bottom housing 120. In some embodiments, the multiple guiding vanes 122a are spaced apart from each other on the periphery of the guiding portion 16. A guiding-vane passage is formed between two adjacent guiding vanes 122a, and the guiding-vane passage is in communication with the flowing passage 140. The flowing medium from the flowing passage 140 may enter the waste collection chamber 10 through the guiding-vane passage. The guiding-vane passage formed between two adjacent guiding vanes 122a may reduce the velocity of the flowing medium.

In some embodiments, each of the multiple guiding vanes 122a includes multiple guiding segments. The multiple guiding segments includes a front straight segment towards the guiding portion 16. The front straight segment is the inlet of the guiding vane 122a, and the front straight segment is a straight segment. The front straight segment has a linear direction extending away from the guiding portion 16, that is, a tangential direction of the inlet of the guiding vane 122a. For the rotating fluid in the first filter chamber, when flowing to the end point of the front straight segment close to the guiding portion 16 in the rotating process, the fluid may have a tangential direction opposite to the aforesaid linear direction. By associating the extending direction of the front straight segment with the tangential direction of the rotating fluid, the velocity of the flowing medium that is about to flow into the waste collection chamber 10 may be restricted, and the disturbance of the strong cyclone in the flowing passage 140 on the waste collection chamber 10 may be weakened, in this way, the waste particles may be deposited after entering the waste collection chamber 10, thereby realizing the collection of particles.

In some embodiments, as shown in FIGS. 2 and 4, the cyclone separator 1 also includes a driving element 17 and a first cleaning element 181. The first cleaning element 181 is attached to the outer wall of the first filter element 131. The driving element 17 is configured to drive the first cleaning element 181 to move relative to the first filter element 131.

In some embodiments, in a using process of the cyclone separator 1, there is still a certain probability that a small amount of wastes may be adhered to the first filter element 131. After the cyclone separator 1 is operated multiple times for a long time, more wastes may be accumulated on the first filter element 131. Although some wastes may be washed back to the collection chamber 10 under a scouring effect of the fluid, there may still be some wastes that are difficult to be separated from the first filter element 131 under the scouring effect of the fluid. Therefore, the cyclone separator 1 also includes a driving element 17 and a first cleaning element 181. The first cleaning element 181 is attached to the outer wall of the first filter element 131. When the driving element 17 drives the first cleaning element 181 to move relative to the first filter element 131, the first cleaning element 181 may clean the outer wall of the first filter element 131, thereby separating the stubborn wastes adhering to the first filter element 131. The separated wastes may enter the waste collection chamber 10 through the flowing passage 140 and the guiding-vane passage under the action of strong cyclone, thereby being collected.

In some embodiments, as shown in FIGS. 2 and 4, the first cleaning element is located in the flowing passage 140. The first cleaning element 181 is attached to the outer wall of the first filter element 131, and the first cleaning element 181 is configured to clean the outer wall of the first filter element 131. The cyclone separator 1 also includes a first transmission assembly. The driving element 17 is connected to the first cleaning element 181 through the first transmission assembly. By using the first transmission assembly, the driving element 17, the first cleaning element 181, and the first filter element 131 may be flexibly arranged with a great freedom degree. The direction of power transmission may be changed through the first transmission assembly.

In some embodiments, the cyclone separator 1 also includes a second cleaning element 182. The second cleaning element 182 is located in the reflux passage 141. The second cleaning element 182 is attached to the outer wall of the second filter element 132, and the second cleaning element 182 is configured to clean the outer wall of the second filter element 132. The cyclone separator 1 also includes a second transmission assembly. The driving element 17 is connected to the second cleaning element 182 through the second transmission assembly. By using the second transmission assembly, the driving element 17, the second cleaning element 182, and the second filter element 132 may be flexibly arranged with a great freedom degree. The direction of power transmission may be changed through the second transmission assembly.

It should be noted that, by using the first transmission assembly and the second transmission assembly, one driving element 17 may drive two cleaning elements (the first cleaning element 181 and the second cleaning element 182) simultaneously. A driving mode of one driving two may be realized, and the compactness of the structure of the cyclone separator 1 may be effectively improved.

Figure 5:
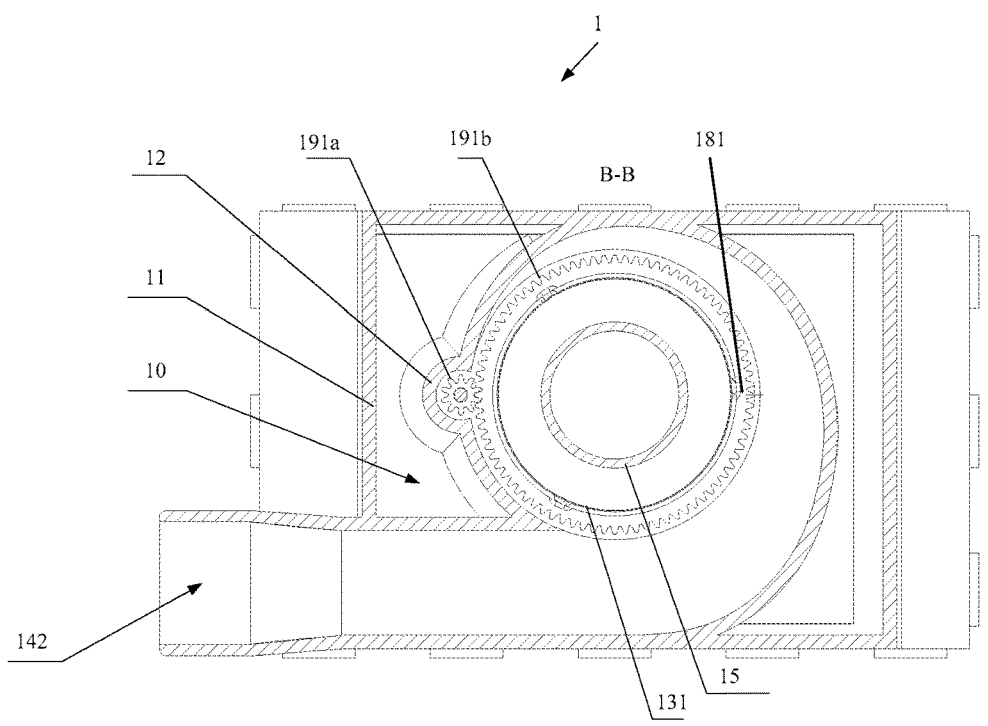
FIG. 5 is a sectional view of the cyclone separator shown in FIG. 3 along B-B according to some embodiments of the present disclosure.

In some embodiments, as shown in FIGS. 1, 4, and 5, the driving element 17 includes a driving motor. The first transmission assembly includes at least one first driving gear 191a and at least one first driven gear 191b. The at least one first driving gear 191a is sleeved on the transmission shaft 171 of the driving motor. The at least one first driven gear 191b is arranged on the first cleaning element 181. The at least one first driven gear 191b is correspondingly engaged to and connected to the at least one first driving gear 191a.

In some embodiments, the driving element 17 includes a driving motor. The driving motor has the advantages of simple structure, small space occupation, and low cost.

It should be noted that, the driving motor includes a transmission shaft 171. A coupler 172, a bearing 174, and a sealing element 173 are sleeved on the transmission shaft 171. The coupler 172 is located out of the first housing 11. The bearing 174 is embedded in the outer wall of the first housing 11. The sealing element 173 is embedded in the inner wall of the first housing 11. A part of the sealing element 173 contacts the reflux passage 141. In some embodiments, the sealing element 173 is an oil-sealing bearing 174.

In some embodiments, the second transmission assembly includes a second driving gear 192a and a second driven gear 192b. The second driving gear 192a is sleeved on the transmission shaft 171 of the driving motor. The transmission shaft 171 and the second driving gear 192a rotate synchronously. The second cleaning element 182 is also provided with a second driven gear 192b. The second driven gear 192b and the second cleaning element 182 may rotate synchronously. The second driven gear 192b is engaged with the second driving gear 192a. During the operation of the driving motor, the transmission shaft 171 rotates, and the second driving gear 192a and the second driven gear 192b also rotate synchronously when driven by the transmission shaft 171, thereby driving the second cleaning element 182 to rotate relative to the second filter element 132, in this way, the adhering wastes are separated from the outer wall of the second filter element 132.

In some embodiments, the number of the at least one first driven gear 191b is at least two, and the at least two first driven gears 191b are spaced apart from each other on the first filter element 131. The first cleaning element 181 is arranged between two adjacent first driven gears 191b.

In some embodiments, due to the large volume of the first filter element 131, the length of the first filter element 131 is great. In order to ensure that the entire outer wall of the first filter element 131 is effectively cleaned by the first cleaning element 181, the length of the first cleaning element 181 is great. In order to ensure that the first cleaning element 181 smoothly scraps the first filter element 131, the number of the first driven gears 191b is at least two, and the first cleaning element 181 is connected between two adjacent first driven gears 191b. At this time, the first driven gear 191b may transmit stable power to the first cleaning element 181, in this way, the first cleaning element 181 may run smoothly relative to the first filter element 131.

In some embodiments, the cyclone separator 1 also includes at least one reinforcing rib. The at least one reinforcing rib is connected to the first cleaning element 181. The at least one reinforcing rib extends around the outer wall of the first filter element 131.

In some embodiments, the cyclone separator 1 also includes at least one reinforcing rib. The at least one reinforcing rib is connected to the first cleaning element 181, and the reinforcing rib moves synchronously with the first cleaning member 181. The reinforcing rib extends around the outer wall of the first filtering member 131, so as to provide structural support for the first cleaning member 181, and avoid the deformation of the first cleaning member 181 when there are too much wastes adhering to the first filtering member 131 and the wastes are difficult to be separated.

Figure 7:
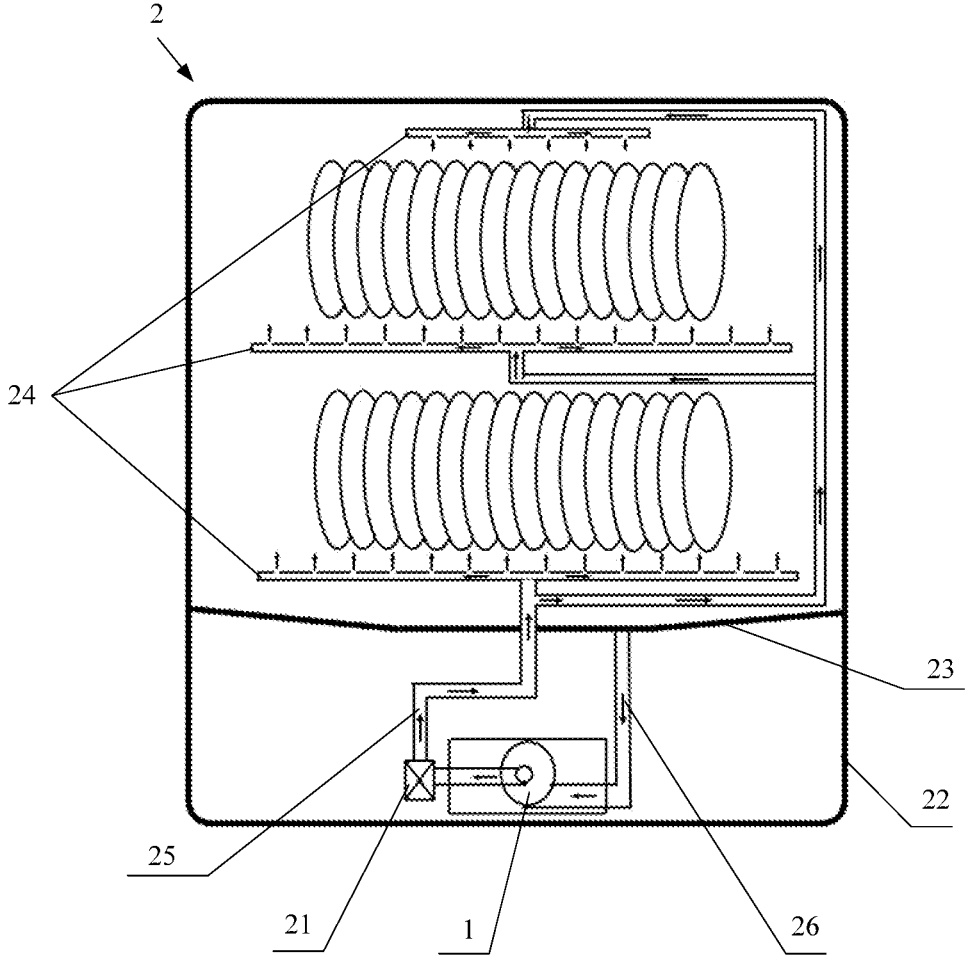
FIG. 7 is a schematic structural view of a dishwasher according to some embodiments of the present disclosure.

According to the second aspect of the present disclosure, as shown in FIG. 7, a dishwasher 2 is provided. The dishwasher 2 includes the cyclone separator 1 provided by any one of the aforesaid designs and a pump assembly 21. The pump assembly 21 is connected to the output pipe of the cyclone separator 1, and the pump assembly 21 is configured to pump the flowing medium.

The dishwasher 2 provided by the present disclosure includes the cyclone separator 1 provided by any one of the aforesaid designs. Therefore, the dishwasher 2 has all the beneficial effects of the cyclone separator 1, which may not be described herein.

In some embodiments, the dishwasher 2 also includes a pump assembly 21. The pump assembly 21 is connected to the output pipe of the cyclone separator 1. The pump assembly 21 may pump clean fluid separated from the cyclone separator 1 to the region to be cleaned again, in this way, a circulation filtration is performed inside the dishwasher 2, and water resources may be saved.

In some embodiments, the dishwasher 2 also includes a shell 22, a chassis 23, and an installation chamber. The chassis 23 is arranged in the shell 22. The installation chamber is located between the shell 22 and the bottom wall of the chassis 23. The pump assembly 21 and the cyclone separator 1 are located in the installation chamber, and the input pipe of the cyclone separator 1 is away from the chassis 23 compared with the output pipe of the cyclone separator 1.

In some embodiments, the dishwasher 2 further includes the shell 22, the chassis 23, and the installation chamber. The chassis 23 is arranged in the shell 22. The shell 22 forms the outer contour of the dishwasher 2. The chassis 23 is configured to separate the shell 22 into an upper chamber and a lower chamber. The lower chamber is the installation chamber. The pump assembly 21 and the cyclone separator 1 are located in the installation chamber. The cyclone separator 1 is placed horizontally in the installation chamber, that is, the central axis of the filter chamber of the cyclone separator 1 extends horizontally. At this time, the input pipe of the cyclone separator 1 is away from the chassis 23 compared with the output pipe of the cyclone separator 1. That is to say, compared with the output pipe, the input pipe is closer to the horizontal plane on which the dishwasher 2 is placed, and the liquid-level depth of the input pipe may be deeper. When the water sprayed on tableware falls by gravity, it is difficult to bring air into the cyclone separator 1 through the input pipe, which may weaken the air suction effect of the pump assembly 21 located at downstream of the cyclone separator 1, and the dynamic performance of the pump assembly 21 may be improved.

In some embodiments, the dishwasher 2 also includes a washing chamber, multiple spray arms 24, and a liquid-supply pipeline 25. The washing chamber is located on the side of the chassis 23 away from the cyclone separator 1. The multiple spray arms 24 are spaced apart from each other in the washing chamber. The multiple spray arms 24 are in communication with a pump outlet of the pump assembly 21 through the liquid-supply pipeline 25.

In some embodiments, the dishwasher 2 also includes a washing chamber located above the chassis 23. The washing chamber is configured to place dishes to be washed. Multiple spray arms 24 are spaced apart from each other in the washing chamber, so as to spray and wash the dishes to be washed at various positions in the washing chamber. The multiple spray arms 24 are in communication with the pump outlet of the pump assembly 21 through the liquid-supply pipeline 25. The filtered fluid in the cyclone separator 1 enters the pump assembly 21 through the output pipe, flows out of the pump assembly 21 through the pump outlet after being pressurized in the pump assembly 21, and then flows to the multiple spray arms 24 through the liquid-supply pipeline 25, thereby realizing spray cleaning.

In some embodiments, the multiple spray arms 24 include a first spray arm 24 and a second spray arm 24. The spray directions of the first spray arm 24 and the second spray arm 24 are opposite to each other.

In some embodiments, the multiple spray arms 24 include the first spray arm 24 and the second spray arm 24. The spray directions of the first spray arm 24 and the second spray arm 24 are opposite to each other, so that the dishes to be washed in different regions may be washed.

In some embodiments, the first spray arm 24 is located at the top of the washing chamber, and the first spray arm 24 sprays downwards. Compared to the first spray arm 24, the second spray arm 24 is arranged close to the chassis 23, and the second spray arm 24 sprays upwards. For the same dish to be washed, the first spray arm 24 may wash its upper surface, and the second spray arm 24 may wash its lower surface. In this way, it may be ensured that different regions of the dish to be washed may be washed pertinently, and the cleaning effect of dishwasher 2 may be improved.

In some embodiments, the number of the first spray arm 24 is at least one, and the number of the second spray arm 24 is at least one, which may be adapted based on the size of the space in the washing chamber.

In some embodiments, at least a part of the chassis 23 recesses towards the inner of the installation chamber to form a receiving groove. The dishwasher 2 also includes a circulation opening and a circulation pipeline 26. The circulation opening is located on the chassis 23 and is in communication with the receiving groove. One end of the circulation pipeline 26 is connected to the chassis 23, the circulation pipeline 26 is in communication with the circulation opening, and the other end of the circulation pipeline 26 is in communication with the input pipe.

In some embodiments, at least a part of the chassis 23 recesses towards the inner of the installation chamber, that is, at least a part of the chassis 23 recesses downwards to form a receiving groove. The liquid sprayed from the multiple spray arms 24 in the washing chamber may fall into the receiving groove after scouring the dishes to be washed. The chassis 23 further defines a circulation opening. The circulation opening is in communication with the input pipe of the cyclone separator 1 through a circulation pipeline 26. In this way, the flowing medium with waste particles may be transported to the cyclone separator 1 through the circulation opening and the circulation pipeline 26, and then a circulation-filtration cleaning may be achieved through the filtration of the first filter element 131 and the second filter element 132 in the cyclone separator 1.

In the present disclosure, the term "plurality" or "multiple" refers to two or more, unless explicitly defined otherwise. The terms "mounted", "interconnected", "connected", "fixed", and the like are to be construed broadly, e.g., "connected" may be a fixed connection, a detachable connection, or an integral connection. "interconnected" may be directly connected or indirectly connected through an intermediary. The specific meaning of the terms in the present disclosure may be understood by those of ordinary skill in the art according to specific cases.

In the description of the present specification, the description of the terms "one embodiment", "some embodiments", "specific embodiments", etc., means that a particular feature, structure, material, or characteristic described in combination with some embodiments or example is included in at least some embodiments or example of the present disclosure. In this specification, schematic representations of those terms do not necessarily refer to the same embodiments or example. Furthermore, the particular features, structures, materials, or characteristics described may be combined in any one or more embodiments or examples in any suitable manner.

The foregoing is merely some preferred embodiments of the present disclosure and is not intended to limit the present disclosure. For those skilled in the art, the present disclosure may have various modifications and changes. Any modifications, equivalents, improvements, etc. that are within the spirit and principles of present disclosure are intended to be included within the scope of present disclosure.

What is claimed is:

1. A cyclone separator, comprising:
   a first housing;
   a second housing, arranged in the first housing, wherein a waste collection chamber is arranged between the second housing and the first housing;
   a first filter element, arranged in the second housing and enclosed to form a first filter chamber;

a flowing passage, located between the first filter element and the second housing, wherein the flowing passage is in communication with the first filter chamber through a filter hole, and the waste collection chamber is in communication with the flowing passage;

an input pipe, in communication with the flowing passage, wherein a flowing medium is capable of entering the cyclone separator through the input pipe and forming a cyclone in the flowing passage;

an output pipe, in communication with the first filter chamber, wherein the flowing medium is capable of being discharged from the cyclone separator through the output pipe; and a reflux portion, wherein the flowing medium is capable of flowing from the waste collection chamber to the output pipe through the reflux portion.

2. The cyclone separator according to claim 1, wherein the reflux portion comprises a reflux opening arranged on the output pipe, and the reflux opening is arranged out of the first filter chamber.

3. The cyclone separator according to claim 2, wherein the output pipe comprises an outer pipe and an inner pipe in communication with each other, at least part of the inner pipe is arranged out of the first filter chamber and located in the first housing, the reflux opening is arranged on the inner pipe and located out of the first filter chamber, and the outer pipe is located out of the first housing.

4. The cyclone separator according to claim 3, wherein the inner pipe and the first filter chamber are arranged coaxially.

5. The cyclone separator according to claim 1, further comprising:

a second filter element, arranged between the waste collection chamber and the reflux portion, wherein the flowing medium is capable of flowing from the reflux portion to the output pipe after passing through the second filter element.

6. The cyclone separator according to claim 1, further comprising:

a waste-discharge outlet, in communication with the waste collection chamber.

7. The cyclone separator according to claim 1, wherein a buffer portion is formed by a part of the second housing protruding away from the first filter element.

8. The cyclone separator according to claim 1, further comprising:

a guiding portion, located in the first filter chamber.

9. The cyclone separator according to claim 8, wherein the guiding portion includes a cone, a top of the cone is close to the output pipe, and a bottom of the cone is away from the output pipe.

10. The cyclone separator according to claim 8, further comprising:

a bottom housing, connected to the first housing, wherein the second housing is located between the bottom housing and the first housing;

wherein a channel is formed between the bottom housing and the second housing, the flowing passage is in communication with the waste collection chamber through the channel, and the reflux portion is arranged away from the bottom housing.

11. The cyclone separator according to claim 10, further comprising:

a guiding element, arranged on the bottom housing and located in the channel.

12. The cyclone separator according to claim 11, wherein the guiding element comprises:

a plurality of guiding vanes, spaced apart from each other on the bottom housing, wherein a tangential direction of an inlet of each of the plurality of guiding vanes is opposite to a rotating direction of the flowing medium in the second housing.

13. The cyclone separator according to claim 1, further comprising:

a driving element; and a first cleaning element, attached to an outer wall of the first filter element, wherein the driving element is configured to drive the first cleaning element to move relative to the first filter element.

14. A dishwasher, comprising:

a cyclone separator comprising:

a first housing;

a second housing, arranged in the first housing, wherein a waste collection chamber is arranged between the second housing and the first housing;

a first filter element, arranged in the second housing and enclosed to form a first filter chamber;

a flowing passage, located between the first filter element and the second housing, wherein the flowing passage is in communication with the first filter chamber through a filter hole, and the waste collection chamber is in communication with the flowing passage;

an input pipe, in communication with the flowing passage, wherein a flowing medium is capable of entering the cyclone separator through the input pipe and forming a cyclone in the flowing passage;

an output pipe, in communication with the first filter chamber, wherein the flowing medium is capable of being discharged from the cyclone separator through the output pipe; and a reflux portion, wherein the flowing medium is capable of flowing from the waste collection chamber to the output pipe through the reflux portion; and a pump assembly, in communication with an output pipe or an input pipe of the cyclone separator, wherein the pump assembly is configured to pump a flowing medium.

15. The dishwasher according to claim 14, wherein the input pipe of the cyclone separator is located at a level lower than a level where the output pipe of the cyclone separator is located.

16. The dishwasher according to claim 14, wherein the reflux portion comprises a reflux opening arranged on the output pipe, and the reflux opening is arranged out of the first filter chamber.

17. The dishwasher according to claim 16, wherein the output pipe comprises an outer pipe and an inner pipe in communication with each other, at least part of the inner pipe is arranged out of the first filter chamber and located in the first housing, the reflux opening is arranged on the inner pipe and located out of the first filter chamber, and the outer pipe is located out of the first housing.

18. The dishwasher according to claim 17, wherein the inner pipe and the first filter chamber are arranged coaxially.

19. The dishwasher according to claim 14, further comprising:

a second filter element, arranged between the waste collection chamber and the reflux portion, wherein the flowing medium is capable of flowing from the reflux portion to the output pipe after passing through the second filter element.

20. The dishwasher according to claim 14, further comprising:

a waste-discharge outlet, in communication with the waste collection chamber.

\*     \*     \*     \*     \*